United States Patent [19]

Dakin

[11] Patent Number: 4,673,299
[45] Date of Patent: Jun. 16, 1987

[54] TEMPERATURE MEASURING ARRANGEMENTS USING OPTICAL FIBRE SENSOR

[75] Inventor: John P. Dakin, Romsey, England

[73] Assignee: Plessey Overseas Limited, Ilford, England

[21] Appl. No.: 716,662

[22] Filed: Mar. 27, 1985

[30] Foreign Application Priority Data

Mar. 28, 1984 [GB] United Kingdom ............... 8407945

[51] Int. Cl.$^4$ .......................... G01J 5/02; G01N 21/84
[52] U.S. Cl. .................................. 374/131; 250/458.1; 356/73.1; 374/161
[58] Field of Search .............................. 374/161, 131; 250/483.1, 486.1; 350/96.15; 356/73.1

[56] References Cited

U.S. PATENT DOCUMENTS

| | | | |
|---|---|---|---|
| 4,215,275 | 7/1980 | Wickersheim | 374/159 X |
| 4,262,198 | 4/1981 | Gupta et al. | 250/340 X |
| 4,281,245 | 7/1981 | Brogandh et al. | 250/227 |
| 4,302,970 | 12/1981 | Snitzer et al. | 374/161 |
| 4,307,607 | 12/1981 | Saaski et al. | 374/161 |
| 4,437,772 | 3/1984 | Samulski | 374/159 X |
| 4,448,547 | 5/1984 | Wickersheim | 374/159 X |
| 4,459,044 | 7/1984 | Alves | 374/159 X |
| 4,497,575 | 2/1985 | Phillip | 356/73.1 |
| 4,542,987 | 9/1985 | Herschfeld | 356/44 |
| 4,545,253 | 10/1985 | Avicola | 250/227 X |
| 4,562,348 | 12/1985 | Brogandh et al. | 73/800 X |

OTHER PUBLICATIONS

"Principles of Optical Measurements", D. Marcuse; ©1981, pp. 255–256, 236–237, TK5103 59(M-3), p. 250.
"Optical Transmission and Liquid-Core Fibres" by J. Stone, Applied Physics Letters, vol. 20, No. 7, Apr. 1, 1972, pp. 239–240.
"Loss Measurements in Optical Fibers 1: Sensitivity Limit of Bolometric Techniques" by R. Cohen, Applied Optics, vol. 13, No. 11, Nov. 1974, pp. 2518–2521.

*Primary Examiner*—Daniel M. Yasich
*Attorney, Agent, or Firm*—Fleit, Jacobson, Cohn & Price

[57] ABSTRACT

A temperature measuring arrangement including a relatively long optical fibre temperature sensor doped along its length with material that absorbs light in dependence upon temperature, launcher for launching into one end of the temperature sensor fibre contemporaneous light pulses of two different wavelengths and comparator for comparing variations with time in back-scattered light of the two different wavelengths returned along the sensor fibre in order to provide an indication of the temperature distribution along the fibre, the two wavelengths of the light pulses launched into the fibre sensor being chosen so that they correspond with different absorption bands of the doped material.

13 Claims, 4 Drawing Figures

TEMPERATURE MEASURING ARRANGEMENTS USING OPTICAL FIBRE SENSOR

This invention relates to temperature measuring arrangements and relates more specifically to temperature measuring arrangements using optical fibre temperature sensing means for sensing temperature distribution over a relatively long path (e.g. 50 meters to 10 kilometers).

SUMMARY

According to one aspect of the present invention a temperature measuring arrangement comprises a relatively long optical fibre temperature sensor doped along its length with material that absorbs light in dependence upon temperature, means for launching, into one end of the temperature sensor fibre, contemporaneous light pulses of two different wave lengths and means for comparing the level of back-scattered light over time, for, the two different wavelengths. The back-scattered light is returned along the sensor fibre and the level provides an indication of the temperature distribution along the fibre.

The two wavelengths are chosen so that they correspond with different absorption bands of the doped material (i.e. bands producing different variations of absorption of light with temperature). Thus by comparing absorptions at different wavelengths any variations in the dopant concentration along the sensing fibre will be compensated for.

According to a preferred aspect of the present invention, a temperature measuring arrangement comprises a relatively long optical fibre temperature sensor doped along its length with material that fluoresces in response to the absorption of light in dependence upon temperature, means for launching light pulses into one end of the sensor fibre and means for detecting the variations with time in the levels of fluorescent light emitted by the doped material in response to the light pulses which returns to the launch end of the sensor fibre.

In this latter embodiment the dopant material (e.g. rare earth material) of the sensor fibre effectively produces radiant re-emission of the absorbed light energy (i.e. fluorescence) at a longer wavelength than that of the light pulses launched into the sensor fibre. The wavelength of these light pulses and the dopant material will be chosen so that the light content of the light pulses as the latter reach the end of the sensor fibre remote from the launch end will still be at a reasonable level, even after absorption of the light by the dopant material of the sensor fibre has taken place. Temperature-dependent variations in the levels of fluorescent emission along the sensor fibre can readily be detected at the launch end of the sensor fibre using techniques similar to those normally employed for optical time domain reflectometry (herein OTDR). In optical time domain relfectometry, the time interval between the launching of the light pulses into the launch end of the optical fibre sensor and the arrival of back-scattered light therefrom at the detectors indicates the location along the optical fibre sensor from which the back-scattered light has returned. The instantaneous level of such light will give an indication of the temperature of the sensor and the time differential indicates the location along the fibre of the temperature reading.

The fluorescent light returned to the launch end of the sensor fibre may be measured in a single narrow wavelength region but it is preferred to measure the fluorescent light in two wavelengths or specific wavelength regions simultaneously in order to compensate for any variations in dopant material concentration along the sensing fibre. With single wavelength measurement, the variations in the levels of returned fluorescent light are used to deduce the temperature variations along the sensor fibre, whereas with dual wavelength measurement the variations in the ratio of levels of returned fluorescent light are used to deduce temperature distribution. It will be apparent therefore that in the case of dual wavelength measurement the two wavelengths concerned will need to be selected so that there is a relative difference in levels between the fluorescent emission with temperature at these wavelengths. Notwithstanding whether the single wavelength measurement or the dual wavelength measurement technique is used, the specific wavelength or wavelengths chosen will be subject to low absorption during return of the light to the detector means at the launch end of the sensor fibre.

BRIEF DESCRIPTION OF THE DRAWINGS

By way of example two embodiments of the present invention will now be described with reference to the accompanying drawings in which.

DETAILED DESCRIPTION OF THE DRAWINGS

Figure 1:
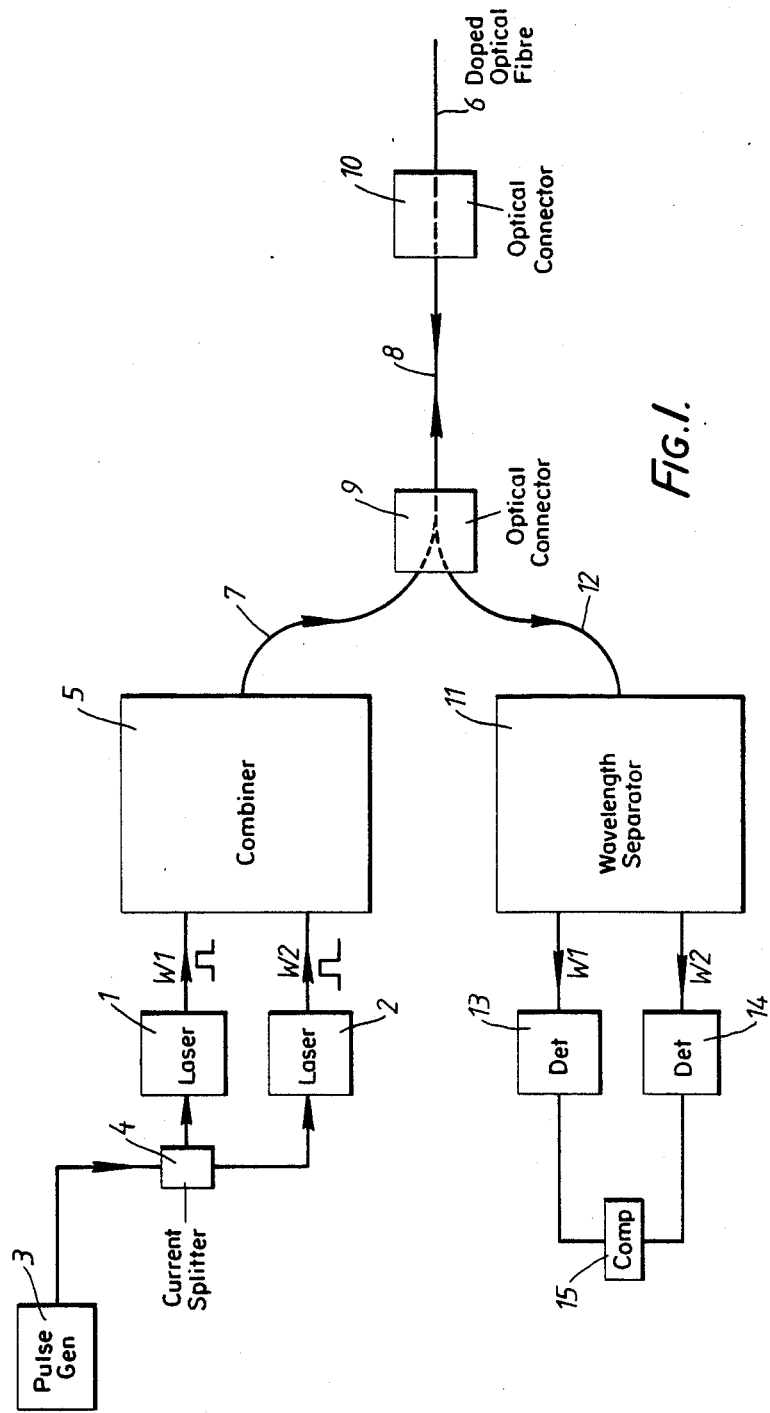
FIG. 1 is a schematic diagram of one arrangement for measuring the temperature distribution along an optical fibre sensor.

Referring to FIG. 1 of the drawings the temperature distribution measuring arrangement illustrated comprises two lasers 1 and 2 arranged to be operated by electrical pulses received from pulse generating means 3 through electrical current splitter means 4. The lasers 1 and 2 accordingly produce light pulses having different wavelengths W1 and W2. These light pulses are fed into power combining means 5 (e.g. fibre tee or discrete cube beam-combiner) for launching the pulses simultaneously into a sensing optical fibre 6 (monomode or multimode) after being transmitted through conventional connecting optical fibres 7 and 8 and optical connectors 9 and 10. The length of the sensing fibre 6 which has a similar geometry and numerical aperture to the conventional connecting fibre 8 will be predetermined in accordance with the path length or extent of a region to be monitored in the specific application of the temperature measuring arrangement (e.g. process control, fire and overheating detection, thermal sensing etc.). However, the monitoring of fibre path lengths of 50 meters to 10 kilometers is envisaged.

The sensing fibre 6 which may be of silica is doped along its length with a material (e.g. neodymium or europium) which absorbs a small proportion of the light content of the light pulses as they travel along the fibre in dependence upon the temperature distribution along the fibre. However, the wavelengths W1 and W2 of the simultaneous light pulses are chosen so that they correspond with different absorption bands in the sensing fibre and thereby produce different variations of absorption with temperature. By this arrangement any variations in the dopant concentration along the sensing fibre 6 will be compensated for.

As the simultaneous light pulses of wavelengths W1 and W2 travel along the conventional fibre 8 and through the connector 10 and then along the sensing fibre 6 the light pulses will be attenuated, and as regards the attenuation of the respective light pulses travelling along the sensing fibre 6, this will be dependent upon the temperature variations along the sensing fibre. Some of the light content of the pulses is reflected back along the sensing fibre 6 as back-scattered light. The wavelengths of the light pulses are so chosen in relation to the dopant material of the sensing fibre and the temperatures to be experienced by the fibre that the level of back-scattered light, and even the level of light back-scattered from the far end of the optical fibre 6, will be at a reasonably detectable level at wavelength separator 11 and detectors 13 and 14. As will be appreciated, the level of back-scattered light will diminish with the increase in absorption of the light with temperature by the dopant material of the sensing fibre and consequently the variations with respect to time between the back-scattered light at the two wavelengths concerned and a comparison between such variations will provide an indication of temperature distribution along the optical sensing fibre 6.

For this purpose the back-scattered light at the two wavelengths travels back along the sensing fibre 6 and through the connector 10 and conventional fibre 8 and connector 9 to wavelength separation means 11 (e.g. dichroic mirror or diffraction grating dichromator) via an optical fibre 12. The optical outputs at wavelengths W1 and W2 from the separation means 11 are applied to detectors 13 and 14 and corresponding electrical outputs from the detectors are then compared by means of a comparator 15 to determine the ratio between such detected values and to provide an indication of temperature distribution along the sensing fibre.

Figure 3:
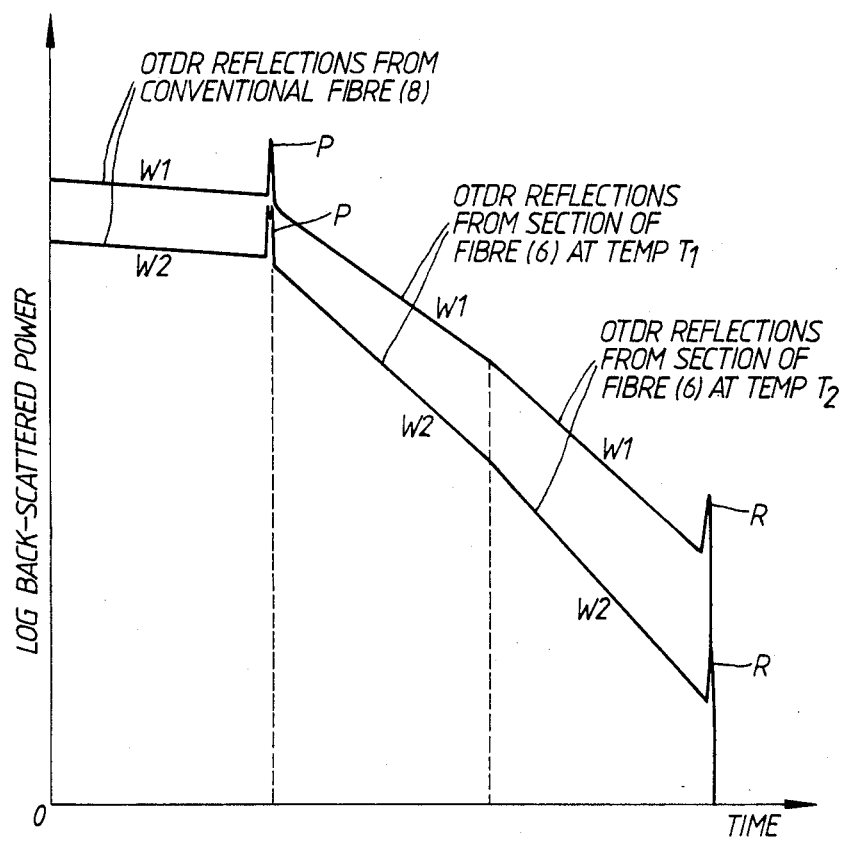

FIG. 3 shows a graph having the logarithmic values of the back-scattered light plotted against time. Time is proportional to the distance travelled by the light pulses along the sensing fibre 6. For the sake of convenience and ease of understanding it is assumed that two sections of the sensing fibre 6 are subjected to uniform temperatures T1 and T2 respectively. As can be seen the variations in the ratio of back-scattered light at or about the wavelengths W1 and W2 at the two temperatures T1 and T2 can be utilised to provide an indication of temperature distribution along the sensing fibre via OTDR, the optical time domain reflectometry reflections. It will also be seen that the light content of the pulses at the far end of the sensing fibre where there are reflections R is still at a sufficiently high level to ensure an adequate level of back-scattered light for detection purposes. As shown further reflections P may occur at the interface of the connector 10 and the sensing fibre 6.

Figure 2:
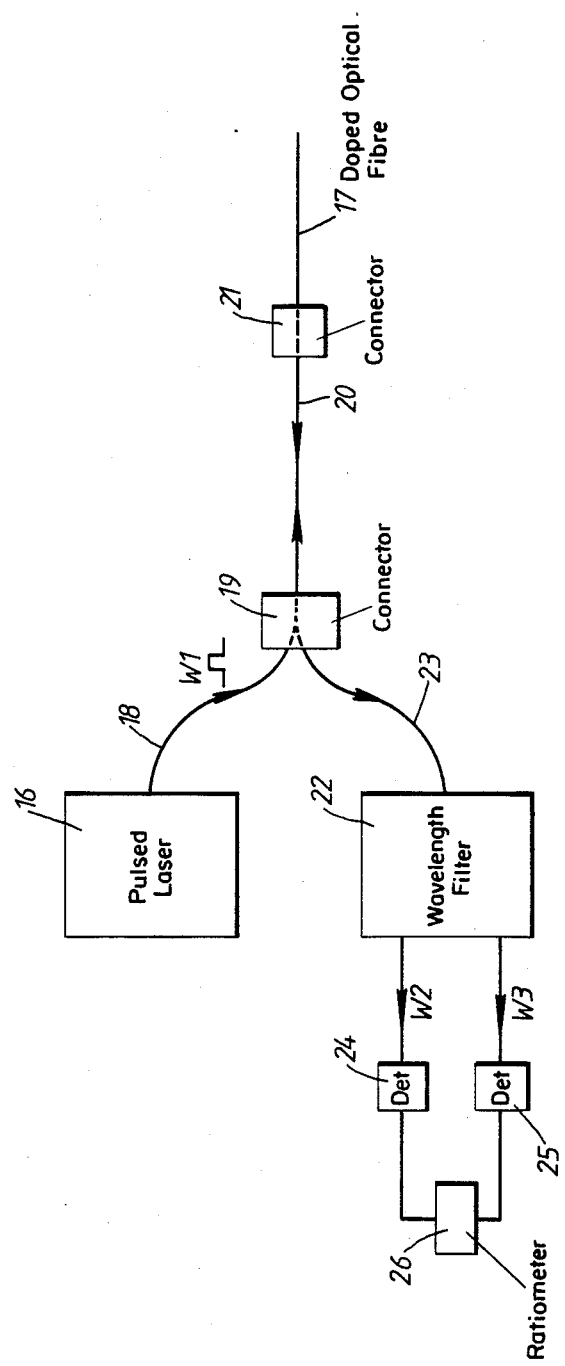
FIG. 2 is a schematic diagram of an alternative temperature distribution measuring arrangement to that shown in FIG. 1; and, FIGS. 3 and 4 show graphs of logarithmic values of back-scattered light against time in respect of the arrangements depicted in FIGS. 1 and 2 respectively.

Referring now to FIG. 2 of the drawings the temperature distribution sensing arrangement depicted comprises a pulsed laser 16 providing an output light pulse of wavelength W1 which is launched into one end of a suitably doped sensing fibre 17 after travelling along an optical fibre 18 and through a first connector 19 and along a conventional fibre 20 and through a connector 21. The sensing fibre 17 is doped with partially light absorbing material which produces fluorescent emission covering the wavelength bands centered on wavelengths W2 and W3 after absorption of light at the wavelength W1.

The relative level of fluorescent light at wavelengths W2 and W3 is dependent upon the level of absorption of light at wavelength W1, which in turn depends upon the temperature of the sensing fibre 17. The fluorescent light at wavelengths W2 and W3 returned along the sensing fibre 17 and the conventional optical fibre 20 is diverted by the connector 19 to a twin wavelength selection filter 22 over an optical fibre 23. The outputs at wavelengths W2 and W3 from the filter 22 are applied to detectors 24 and 25 and the ratio between these outputs is determined by a ratiometer 26 which accordingly provides an indication of the variations of temperature with time along the sensing fibre 17.

As with the first embodiment of the invention, the detection of returning light at two different wavelengths compensates for any variations in the concentration of dopant along the sensing fibre.

Figure 4:
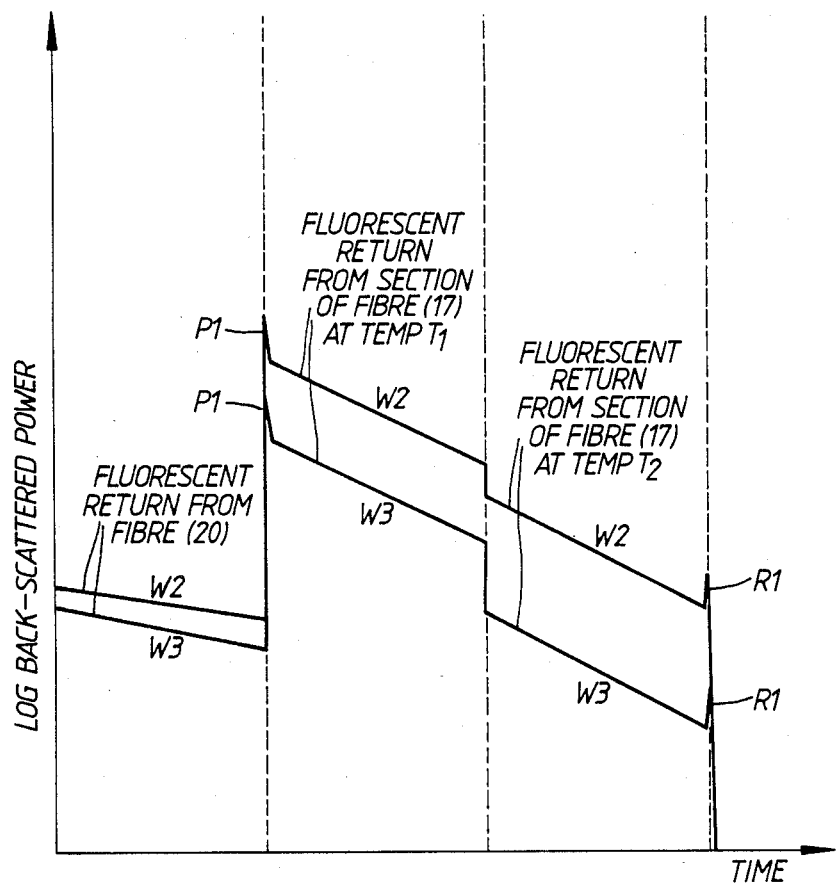

FIG. 4 shows a graph coresponding to that shown in FIG. 3 but in respect of the fluorescent detection arrangement of FIG. 2. As will be seen from the graph of FIG. 4, the sensing fibre 17, for the sake of simplicity, is assumed to have two sections at the respective temperatures T1 and T2. The return, from these fibre sections, of fluorescent light in two wavelength regions, centered on the wavelengths W2 and W3, are shown together with the reflections R1 and P1 from the far end of the sensing fibre and the connector-sensing fibre interface, respectively. As will be seen, in this embodiment the level of returned fluorescent light from the conventional fibre 20 is much lower than the corresponding level of reflected light shown in FIG. 3. This is due to the low fluorescence of the conventional fibre 20 in the present embodiment.

It may here be mentioned that the temperature measuring arrangements according to the present invention as hereinbefore described provide significant advantages over known systems for measuring temperature distribution along optical fibres. In such known systems, errors in temperature measurement may arise due to the presence of solid impurity particles (e.g. dust) or air bubbles within liquid-filled sensing fibres and any variations in the loss, diameter or numerical aperture of the liquid-filled sensing fibre will affect the measurement of temperature. In another known arrangement, a number of optical fibre/filter junctions are provided and these suffer from relatively high loss and, moreover, the present invention provides a method of measuring the temperatures at a series of points along the sensor rather than the temperature distribution along a sensing fibre. Still further, in other known arrangements dopant concentration variations along the sensing fibre may give rise to inaccurate temperature distribution measurements.

I claim:

1. A temperature measuring arrangement comprising a relatively long optical fibre temperature sensor doped along its length with material that absorbs light in dependence upon temperature, means for launching into one end of the temperature sensor fibre two contemporaneous light pulses, each having a different wavelength, and means for comparing variations of levels of back-scattered light of the two different wavelengths returned along the sensor fibre, with respect to the time of return of said back-scattered light, in order to provide an indication of the temperature distribution along the fibre, the two wavelengths correspond to different absorption wavelengths within the absorption band of the doped material.

2. A temperature measuring arrangement as claimed in claim 1, in which the light pulses of two different wavelengths are derived from respective lasers which are pulsed simultaneously by electric pulses produced by pulse generating means.

3. A temperature measuring arrangement as claimed in claim 2, in which the light pulse outputs from the two lasers are fed into power combining means which launches the pulses simultaneously into the sensor fibre.

4. A temperature measuring arrangement as claimed in claim 1, in which the back-scattered light of the two different wavelengths returned along the sensor fibre is fed into wavelength separation means which produces respective outputs at the two different wavelengths which are then applied to respective opto-electric detectors for the generation of electrical outputs arranged to be fed to comparator means to determine the ratio between the detected outputs and to provide an indication of temperature distribution along the sensor fibre.

5. A temperature measuring arrangement as claimed in claim 1, in which the dopant material is neodymium or europium.

6. A temperature measuring arrangement comprising a relatively long optical fibre temperture sensor doped along its length with material that fluoresces in response to the absorption of light in dependence upon temperature, means for launching light pulses into one end of the sensor fibre and means for detecting, at said one end, variations in the levels of fluorescent light which is emitted by the doped material in response to the light pulses and which returns to the launch end of the sensor fibre wherein the time of return of said fluorescent light and the instantaneous level thereof are indicative of the temperature distribution along the fibre.

7. A temperature measuring arrangement as claimed in claim 6, in which the dopant material of the sensor fibre effectively produces radiant re-emission of the absorbed light energy at a longer wavelength than that of the light pulses launched into the sensor fibre, the wavelength of these light pulses and the dopant material being chosen so that the light content of the light pulses as the latter reach the end of the sensor fibre remote from the launch end will still be at a reasonable level even after absorption of the light by the dopant material of the sensor fibre.

8. A temperature measuring arrangement as claimed in claim 6, in which the fluorescent light returned to the launch end of the sensor fibre is arranged to be measured in a single narrow wavelength region.

9. A temperature measuring arrangement as claimed in claim 6, in which the bandwidth of the fluorescent light is separated into two wavelengths or into specific wavelength regions and each wavelength or region is measured simultaneously in order to compensate for any variations in dopant material concentration along the sensor fibre, the variations in the ratio of levels of returned fluorescent light being used to deduce temperature distribution.

10. A temperature measuring arrangement as claimed in claim 9, in which the fluorescent light returned to the launch end of the sensor fibre is applied to filter means to provide light outputs at two different wavelengths and in which these outputs are applied to respective opto-electric detectors to produce electrical outputs which are then compared by means of a ratiometer to provide an indication of variations of temperature with time along the sensor fibre.

11. A temperature measuring arrangement as claimed in claim 6, in which light pulses of one wavelength are produced by a pulsed laser and launched into the sensor fibre.

12. A temperature measuring arrangement comprising a relatively long optical fibre temperature sensor doped along its length with material that absorbs light in dependence upon temperature, means for launching into one end of the temperature sensor fibre two contemporaneous light pulses, each having a different wavelength, from respective lasers fed into a combining means and means for comparing, at said one end, variations of levels of back-scattered light of the two different wavelengths returned along the sensor fibre, with respect to the time of return of said back-scattered light, in order to provide an indication of the temperature distribution along the fibre, the two wavelengths correspond to different absorption wavelengths within the absorption band of the doped material.

13. A temperature measuring arrangement comprising a relatively long optical fibre temperature sensor doped along its length with material that absorbs light in dependence upon temperature, means for launching into one end of the temperature sensor fibre two contemporaneous light pulses, each having a different wavelength, and means for comparing, located at said one end, variations of levels of back-scattered light from the two different wavelengths returned along the sensor fibre, with respect to the return time thereof, in order to provide an indication of the temperature distribution along the fibre, the two wavelengths correspond to different absorption wavelengths within the absorption band of the doped material, wherein the back-scattered light of the two different wavelengths returned along the sensor fibre is fed into wavelength separation means which produces respective outputs at the two different wavelengths which are then applied to respective opto-electric detectors for the generation of electrical outputs arranged to be fed to comparator means to determine the ratio between the detected outputs and to provide an indication of temperature distribution along the sensor fibre.

* * * * *